US007610380B2

(12) United States Patent
Igarashi et al.

(10) Patent No.: US 7,610,380 B2
(45) Date of Patent: Oct. 27, 2009

(54) INFORMATION PROCESSING DEVICE, ACCESS CONTROL PROCESSING METHOD, AND COMPUTER PROGRAM

(75) Inventors: Tatsuya Igarashi, Tokyo (JP); Norifumi Kikkawa, Tokyo (JP); Yoichi Kobori, Kanagawa (JP); Takehiko Morita, Kanagawa (JP); Yasuaki Honda, Chiba (JP); Koichi Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 10/521,624

(22) PCT Filed: Apr. 5, 2004

(86) PCT No.: PCT/JP2004/004919

§ 371 (c)(1),
(2), (4) Date: Jan. 14, 2005

(87) PCT Pub. No.: WO2004/102886

PCT Pub. Date: Nov. 25, 2004

(65) Prior Publication Data

US 2006/0089987 A1    Apr. 27, 2006

(30) Foreign Application Priority Data

May 16, 2003    (JP)    ............................ 2003-138552

(51) Int. Cl.
*G06F 15/173* (2006.01)
(52) U.S. Cl. ........................................ 709/226; 709/228
(58) Field of Classification Search ................ 709/226, 709/229, 225; 715/739; 711/205
See application file for complete search history.

(56) References Cited

U.S. PATENT DOCUMENTS 6,832,321 B1 * 12/2004 Barrett ......................... 726/11

(Continued)

FOREIGN PATENT DOCUMENTS

EP    1 170 925 A1    1/2002

(Continued)

OTHER PUBLICATIONS

Fielding, et al., Hypertext Transfer Protocol—HTTP/1.1, Jun. 1999, Network Working Group, RFC 2616.*

(Continued)

*Primary Examiner*—John Follansbee
*Assistant Examiner*—Madhu Khanna
(74) *Attorney, Agent, or Firm*—Finnegan, Henderson, Farabow, Garrett & Dunner, L.L.P.

(57) ABSTRACT

An apparatus and a method which enable to execute different access controls based on setting modes are realized. A MAC address table in which a manually registered client MAC address and an automatically registered client MAC address are registered in forms to be able to distinguish each other is set. If an access control mode is an automatic registration access control mode, a MAC addresses of an access requesting client is registered until the number of the MAC address reaches a defined limit number of registration: N of the MAC address table, and the access is allowed under the condition of the registration; or if the access control mode is a registered device access control mode, the access is allowed under the condition that the client MAC address is registered in the MAC address table as the manually registered MAC address.

9 Claims, 12 Drawing Sheets

U.S. PATENT DOCUMENTS

| | | | |
|---|---|---|---|
| 7,096,257 B2 * | 8/2006 | Trisno et al. | 709/220 |
| 7,127,524 B1 * | 10/2006 | Renda et al. | 709/245 |
| 2001/0025301 A1 | 9/2001 | Anderson | |
| 2002/0007411 A1 * | 1/2002 | Shaked et al. | 709/229 |
| 2002/0169937 A1 * | 11/2002 | Kagawa | 711/206 |

FOREIGN PATENT DOCUMENTS

| | | |
|---|---|---|
| JP | 3-123137 | 5/1991 |
| JP | 10-271154 | 10/1998 |
| JP | 2001-320373 | 11/2001 |
| JP | 2003-124939 | 4/2003 |

OTHER PUBLICATIONS

European Search Report mailed by the European Patent Office on Nov. 6, 2008 for counterpart Application No. 04725816.5.

Arbaugh W. et al., "Your 802.11 Wireless Network Has No Clothes," IEEE Wireless Communications, Dec. 2002, pp. 44-51.

* cited by examiner

*Fig. 9*

```
GET /tracks/track?id=254 HTTP/1.1 \r\n
Host:192.254.32.11:80 \r\n
X-AV-Client-Info: av=2.0 ; cn ="Sony Corporation" ;mn=Linux-Sample-CP ; mv=2002-11-22-2.0 \r\n
```

INFORMATION PROCESSING DEVICE, ACCESS CONTROL PROCESSING METHOD, AND COMPUTER PROGRAM

TECHNICAL FIELD

The present invention relates to an information processing apparatus, an access control processing method and a computer program. More specifically, it relates to an information processing apparatus, an access control processing method and a computer program, which execute an access control process based on the determination of access authority in communication between network-connected devices.

BACKGROUND ART

Owing to the recent diffusion of a data communication network, a so-called home network, in which a home electric appliance, a computer and other peripheral devices are connected through a network in home so as to allow the communication between the devices, is spreading. By carrying out the communication between network-connected devices, the home network offers convenience and comfort to a user such as to allow a data processing function of each of the devices to be shared and to transmit/receive the contents between the devices. Thus, it is estimated to become more and more popular in the future.

As a protocol suitable for constructing such a home network, an UPnP (registered trademark) is known. The UPnP allows easy construction of a network without any complicated operations and permits a network-connected device to receive a service provided by each of the connected devices without any difficult operations or setting. Moreover, the UPnP is advantageous in that it is not dependent on an OS (operating system) on a device and therefore allows easy addition of a device.

In the UPnP, the connected devices exchange a definition file in conformity with XML (eXtesible Markup Language) for mutual recognition between the devices. The outline of processing of the UPnP is as follows.

(1) Addressing process for acquiring its own device ID such as an IP address.

(2) Discovery process for searching each device on a network to acquire a response from each device so as to acquire information such as device type or a function contained in the response.

(3) Service request process for making a request for a service to each device based on information acquired by the discovery process.

By implementing the above-described processing procedure, a service can be provided and received using network-connected devices. A device to be newly connected to the network acquires a device ID by the above-described addressing process and acquires information of another device connected to the network by the discovery process. A request for a service can be made to another device based on the acquired information.

On the other hand, however, it is required to consider the countermeasure against unauthorized access in this kind of network. A device in the home network, for example, a server or the like, stores the contents requiring the copyright management such as private contents or pay contents in many cases.

Such contents stored in the server in the home network can be accessed from other devices connected through the network. For example, the contents can be acquired by a device implementing the UPnP connection which corresponds to the above-described simple device connection structure. In the case where the contents are video data or music data, if a TV or a player is connected as a network-connected device, a movie can be enjoyed or music can be listened to.

Although access made by a device connected by a user who owes the rights to the use of the contents may be allowed, even a user who does not own the rights to the use of the contents or the like can easily get into the network in the network configuration as described above. For example, in the case of a network constructed by a wireless LAN, unauthorized participation in the network may occur by using a communication device from outside, a next door or the like to a server in home so as to exploit the contents. A configuration permitting such unauthorized access generates secret leakage and also becomes a serious problem in view of the management of the copyright of the contents.

In order to exclude the unauthorized access as described above, a configuration of, for example, making a server possess a list of clients whose access is allowed and executing a collation process with the list in the server upon an access request to the server from a client so as to exclude unauthorized access has been proposed.

For example, MAC (Media Access Control) address filtering for setting a MAC address corresponding to a physical address unique for a network-connected device as an access allowable device list is known. The MAC address filtering is that a MAC address whose access is allowable is registered in advance on a router or a gateway for isolating an internal network (sub-net) such as a home network and an external network from each other, and then collates a MAC address of a received packet with the registered MAC address so as to refuse the access from a device having an unregistered MAC address. This kind of technique is disclosed in, for example, Japanese Patent Application Publication No. 10-271154 (Patent Document 1).

Generally, in order to implement the registration process of the MAC address for restricting the access, however, such a process is required that a user or an administrator searches for the MAC address of a device to be connected to a network and an operator enters the searched MAC address to create a list.

In the home network, the addition of a new device frequently occurs. If the user has to search for the MAC address of a device to implement the registration process at each device addition process as described above, the facility of the network construction is hampered.

On the other hand, a network configuration including not only a PC but also a home electric appliance is constructed even in a general household. Thus, a so-called ubiquitous environment, in which any device can access the network, is being constructed. Moreover, because of the diffusion of a wireless LAN or the like, it becomes easy for a communicable device to get into the wireless LAN from outside. In such a network environment, unauthorized access to the network-connected device is more likely to occur. Therefore, the possibility of exploitation of confidential information, unauthorized read of the contents or the like implemented by unauthorized access becomes more and more likely. In such a condition, an appropriate access control configuration is expected to be easily realized without imposing a burden on a general user.

DISCLOSURE OF THE INVENTION

The present invention is devised in view of the above problems and has an object of providing an information processing apparatus, an access control processing method and a computer program, which enable an access control process in different forms based on a plurality of modes in access control of the information processing apparatus receiving access requests from various devices via a network so as to reduce a burden on a user and to allow the prevention of unrestrained access from an unspecified number of clients.

A first aspect of the present invention is an information processing apparatus for executing an access control process, characterized by including: a memory section storing a MAC address table in which a manually registered client MAC address and an automatically registered client MAC address are registered in forms to be able to distinguish each other; and an access control section for executing different access control processes, in response to an access request from a client, in accordance with an access control mode set in the information processing apparatus being an automatic registration access control mode or a registered device access control mode, wherein the access control section has a structure in that: if the access control mode set in the information processing apparatus is the automatic registration access control mode, a MAC addresses of an access requesting client is registered until the number of the MAC address reaches a defined limit number of registration: N of the MAC address table, and the access control process for allowing the access from the client is executed under the condition of the registration process; and if the access control mode set in the information processing apparatus is the registered device access control mode, the access control process for allowing the access from the client is executed under the condition that the MAC address of the access requesting client is registered in the MAC address table as the manually registered MAC address.

Furthermore, an embodiment of the information processing apparatus of the present invention is characterized in that if the access control mode set in the information processing apparatus is the automatic registration access control mode, the access control section identifies the type of the access request from the client and registers the MAC address of the client up to the defined limit number of registration: N of the MAC address table only in the case where the type of the identified access request corresponds to the type of access request to which access control should be executed, and executes the access control process for allowing the access from the client under the condition of the registration process.

Furthermore, an embodiment of the information processing apparatus of the present invention is characterized in that the type of access request to which the access control should be executed includes at least one of a content request process based on an HTTP (Hyper Text Transfer Protocol)-GET method and a control request process based on a SOAP (Simple Object Access Protocol).

Furthermore, in an embodiment of the information processing apparatus of the present invention, the information processing apparatus is characterized by including a registration processing section for executing a process for registering a client MAC address in the MAC address table as the manually registered client MAC address under the condition that a manual registration process in accordance with a predefined MAC address registration process sequence is executed.

Furthermore, in an embodiment of the information processing apparatus of the present invention, the information processing apparatus is characterized by including a registration processing section for executing a setting change process for changing an automatically registered client MAC address entry in the MAC address table as a manually registered client MAC address entry under the condition that a manual registration process in accordance with a predefined MAC address registration process sequence is executed for the MAC address registered as the client MAC address automatically registered in the MAC address table.

Furthermore, a second aspect of the present invention is an access control processing method in an information processing apparatus being characterized by including: an access request receiving step of receiving an access request from a client; a mode determining step of determining an access control mode set in the information processing apparatus is an automatic registration access control mode or a registered device access control mode; and an access control step of executing an access control process for registering a MAC address of an access requesting client up to a defined limit number of registration: N of a MAC address table, and for allowing the access of the client under the condition of the registration process, if the set access control mode is the automatic registration access control mode; and of executing an access control process for allowing the access of the client under the condition that the MAC address of access requesting client is registered in the MAC address table as a manually registered MAC address if the set access control mode is the registered device access control mode.

Furthermore, an embodiment of the access control processing method of the present invention is characterized in that the access control mode set in the information processing apparatus is the automatic registration access control mode, the access control step identifies the type of access request from the client, registers the MAC address of the client up to the defined limit number of registration: N of the MAC address table only in the case where the type of identified access request corresponds to the type of access request to which a predefined access control should be executed, and executes a process for allowing the access of the client under the condition of the registration process.

Furthermore, an embodiment of the access control processing method of the present invention is characterized in that the type of request to which the access control should be executed includes at least one of a content request process based on an HTTP (Hyper Text Transfer Protocol)-GET method or a control request process based on a SOAP (Simple Object Access Protocol).

Furthermore, in an embodiment of the access control processing method of the present invention, the access control processing method is characterized by further including a registration process step of executing a process of registering a client MAC address in the MAC address table as the manually registered client MAC address under the condition that a manual registration process in accordance with a predefined MAC address registration process sequence is executed.

Furthermore, in an embodiment of the access control processing method of the present invention, the access control processing method is characterized by further including a registration process step of executing a setting change process for changing an automatically registered client MAC address entry to a manually registered client MAC address entry in the MAC address table, under the condition that a manual registration process in accordance with a predefined MAC address registration process sequence is executed for a MAC address registered in the MAC address table as an automatically registered client MAC address.

Furthermore, a third aspect of the present invention is a computer program for executing an access control process in an information processing apparatus, the computer program being characterized by including: a mode determining step of determining an access control mode set in the information processing apparatus is an automatic registration access mode or a registered device access control mode; and an access control step of executing an access control process for registering a MAC address of an access requesting client up to a defined limit number of registration: N of a MAC address table, if a set access control mode is the automatic registration access control mode, and for allowing the access of the client under the condition of the registration process; and of executing an access control process for allowing the access of the client under the condition that the MAC address of the access requesting client is registered in the MAC address table as a manually registered MAC address, if the set access control mode is the registered device access control mode.

In the structure of the present invention, the MAC address table is set, in which a manually registered client MAC address and an automatic registered client MAC address are registered in such a form that they can be distinguished from each other. If the access control mode is the automatic registration access control mode, the MAC address of an access requesting client is registered up to the defined limit number of registration: N of the MAC address table, the access control process for allowing the access of the client is executed under the condition of the registration process. If the access control mode is a registered device access control mode, the access control process for allowing the access of the client is executed under the condition that the MAC address of the access requesting client is registered in the MAC address table as a manually registered MAC address. Therefore, even in the case where the manual registration process is not executed by the user, unrestrained access is prevented. For example, the acquisition of the contents stored in the server from an unspecified number of clients and the like can be prevented. Furthermore, by setting the mode to the registered device access control mode, the execution of strict access control can be executed.

Furthermore, according to the structure of the present invention, the type of the access request from the client is identified in the automatic registration access control mode. Only if the type of the identified access request corresponds to the type of access request to which a predefined access control should be executed, for example, a content request process based on an HTTP (Hyper Text Transfer Protocol)-GET method or a control request process based on a SOAP (Simple Object Access Protocol), the MAC address of the client is registered up to the defined limit number of registration: N of the MAC address table. The access allowance is executed under the condition of the registration process. Therefore, since unnecessary access control can be prevented from being performed in a device discovery process, an information acquisition process or the like in an UPnP or the like.

The computer program of the present invention is, for example, a computer program for a general-propose computer system capable of executing various program codes, for example, a recording medium or a communication medium, which is provided in a computer-readable form, and a recording medium such as a CD, an FD and an MO, that can be provided by a communication medium such as a network. By providing such a program in a computer-readable form, a process in accordance with the program can be realized on a computer system.

The other objects, features and advantages of the present invention will be apparent from the detailed description based on the following embodiments of the present invention and the accompanying drawings. The system in this specification means a logical assembly structure of a plurality of apparatuses, and therefore it is not limited to those including the apparatuses having the respective structures within the same housing.

BRIEF DESCRIPTION OF DRAWINGS

FIG. 9 is a diagram showing exemplary data of an HTTP-GET header contained in an access request from a client;

BEST MODE FOR CARRYING OUT THE INVENTION

Hereinafter, an information processing apparatus, an access control processing method and a computer program of the present invention will be described in detail with reference to the drawings.

[System Outline and MAC Address Table]

Figure 1:
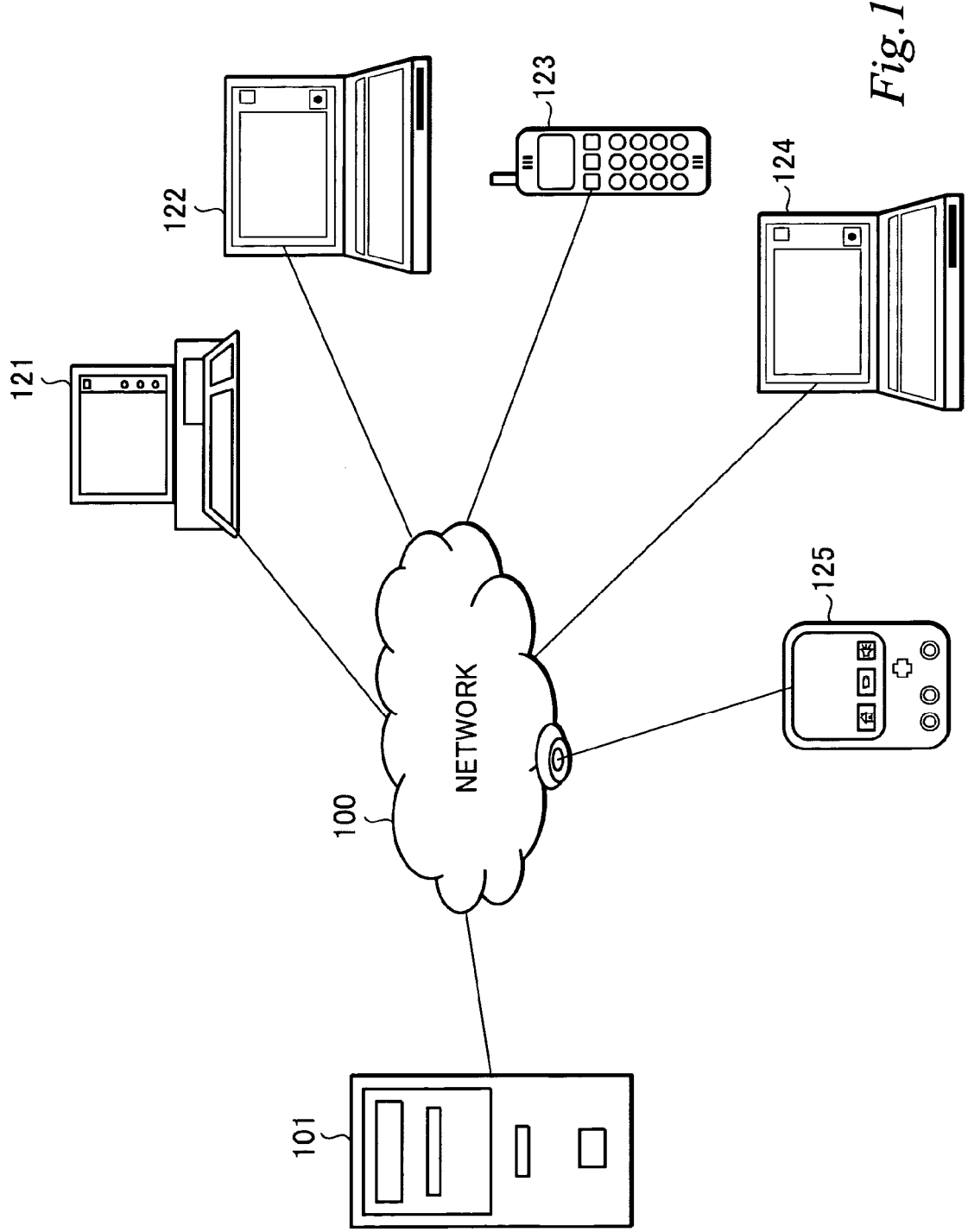
FIG. 1 is an exemplary network configuration to which the present invention is applicable.

First, with reference to FIG. 1, an exemplary network configuration, to which the present invention is applicable, will be described. FIG. 1 shows a configuration, for example, a home network configuration, in which a server 101 for executing processes in accordance with processing requests from various client devices, PCs 121, 122 and 124 corresponding to client devices and mobile communication terminals 123 and 125 such as PDAs or cell phones for making processing requests to the server 101 are connected through a network 100.

The process executed by the server 101 in response to a request from a client are, for example, the provision of the contents stored in storage means such as a hard disk held by the server 101, a data processing service by the execution of an application program executable by the server, or the like. In FIG. 1, the server 101, the PCs 121, 122 and 124 serving as the other client devices, the personal communication assistants 123 and 125 such as the PDAs and the cell phones are illustrated in a distinct manner. However, a device for providing a service in response to a request from a client is illustrated as a server, and therefore, any of the client devices can provide a function as a server if it provides its own data processing service to another client. Therefore, the network-connected client device shown in FIG. 1 may become a server.

The network 100 may be any of wired and wireless networks and the like. Each of the connected devices has a MAC (Media Access Control) address. Each of the network-connected devices transmits and receives via the network 100 a packet having a destination MAC address and a source MAC address as header information, for example, an Ethernet (registered trademark) frame. Specifically, the client transmits an Ethernet frame having a data portion of the frame, which stores processing request information, to the server 101 so as to execute a data processing request to the server 101. In response to the reception of the processing request frame, the server 101 performs an access authority determination process described below, executes data processing under the condition that it is determined to have authority, stores result data corresponding to the results of the data processing in the data portion of the Ethernet frame as needed and transmits it to each client.

The network-connected device is constituted by, for example, a Universal Plug and Play (UPnP)-compatible device. Therefore, the structure allows easy addition and deletion of a connected device to/from the network. A device to be connected to the network can receive a service using a network-connected device by implementing the below-described processing procedure:

(1) Addressing process for acquiring its own device ID such as an IP address;
(2) Discovery process for searching each device on a network to acquire a response from each device so as to acquire information such as device type or a function contained in the response; and
(3) Service request process for making a request for a service to each device based on information acquired by the discovery process.

An exemplary hardware structure of the information processing apparatus such as a PC constituting the server and the client device shown in FIG. 1 will be described with reference to FIG. 2.

A CPU (Central Processing Unit) 301 executes various processes in accordance with a program stored in a ROM (Read Only Memory) 302, a HDD 304 or the like and functions as data processing means or communication control processing means. A RAM 303 appropriately stores a program executed by the CPU 301 or data. The CPU 301, the ROM 302, the RAM 303 and the HDD 304 are interconnected via a bus 305.

An input/output interface 306 is connected to the bus 305. An input section 307 composed of, for example, a keyboard, a switch, a button, a mouse or the like, which is operated by a user, and an output section 308 composed of an LCD, a CRT, a speaker or the like for presenting various information to the user are connected to the input/output interface 306. Furthermore, a communication section 309 functioning as data transmitting/receiving means, and in addition, a removable recording medium 311 such as a magnetic disk, an optical disc, a magneto-optical disc or a semiconductor memory can be inserted. A drive 310 for executing a data reading or writing process from/to these removable recording media 311 is connected.

Figure 2:
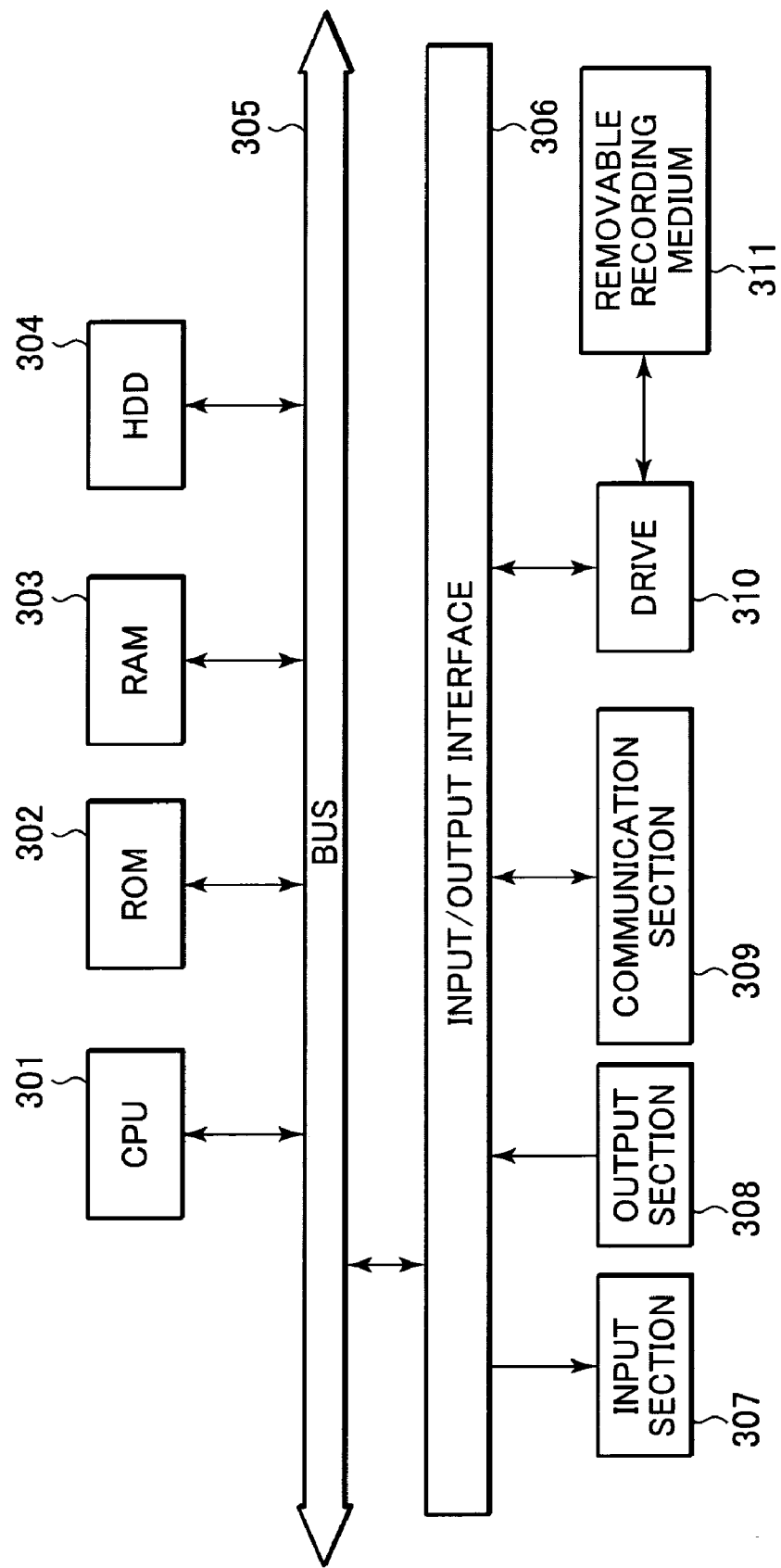
FIG. 2 is a diagram illustrating an exemplary configuration of a network-connected device.

The configuration shown in FIG. 2 is an example of the server or a personal computer (PC) as an example of the network-connected device shown in FIG. 1. However, the network-connected device is not limited to the PC. It can be constructed by a mobile communication terminal such as a cell phone or a PDA or other various electronic devices and information processing apparatuses as shown in FIG. 1. Therefore, it can have a hardware structure unique to each of the devices and executes a process in accordance with the hardware.

In the present invention, the information processing apparatus corresponding to the network-connected device for performing access control stores a MAC address table, in which MAC addresses of network-connected devices having access authority are registered, as a device list of the network-connected devices having access authority, and executes the access control process based on the MAC address table.

The information processing apparatus for executing the access control based on the MAC address table has two access control modes, that is:

(1) automatic registration access control mode; and
(2) registered device access control mode.

In (1) the automatic registration access control mode, when the information processing apparatus, which executes the access control based on the MAC address table, receives an access request from an external device (client), it acquires a source MAC address (client MAC address) from the access request packet and determines whether or not it is identical with the registered MAC address registered in the MAC address table stored in the information processing device. If they are identical, the access is allowed. If not, the MAC address acquired from the access request packet is automatically registered in the MAC address table and allows the access under the condition of the execution of the registration process.

However, the number of MAC addresses to be registered in the MAC address table is preset to a limit number of registration: N (for example, N=5, 10, 15, 63 etc.). Only if the number of MAC addresses to be registered in the MAC address table does not reach the limit number of registration: N, the automatic registration process of the MAC address is executed. After the automatic registration process, the access is allowed.

In (2) the registered device access control mode, in the case where the information processing apparatus, which executes the access control based in the MAC address table, receives the access request from the external device (client), it acquires the source MAC address (client MAC address) from the access request packet and determines whether or not it is identical with the manually registered MAC address which is subjected to the manual registration process in accordance with a predefined MAC address registration process sequence among the registered MAC addresses registered in the MAC address table stored in the information processing apparatus. If it is identical with the manually registered MAC address, the access is allowed. If not, a process for not allowing the access is executed in this mode.

In the information processing apparatus of the present invention, the above-described two modes can be appropriately switched. In each of the set modes, the access control in the above-described form is executed.

An exemplary structure of the MAC address table (MAC list) stored in the memory section so that the information processing apparatus of the present invention performs the access control will be described with reference to FIG. 3. An information processing apparatus 410 serving as the network-connected device for performing the access control receives an access request from various information processing apparatuses 421 to 423 connected via a network and collates a source MAC address contained in the access request and a MAC address stored in a MAC address table (MAC list) 411 with each other.

The MAC address table (MAC list) 411 stored in the memory section of the information processing apparatus 410 has a table structure allowing the storage of entries up to the limit number of registration: N as illustrated, and stores MAC address data in the above-described automatic registration control mode or manually registered in accordance with a predefined sequence.

Moreover, data indicating whether or not the registered MAC address corresponds to manually registered data is set in the MAC address table (MAC list) 411 as data correlated with each of the MAC addresses.

More specifically, manual registration identification data, which indicates that it is a MAC address registered by a manual registration process in accordance with the preset registration sequence or an automatically registered address in the above-described automatic registration access control mode, is set in the MAC address table 411 in correlation with each of the registered MAC addresses. In FIG. 3, the entry indicated with a symbol "o" in a manual registration field corresponds to a MAC address registered by the manual registration process in accordance with the preset registration sequence.

The MAC address table is stored in the memory section (non-volatile memory) in the information processing apparatus (server) serving as the network-connected device for performing the access control. The MAC address table has a structure for storing the registered data of each client by slot and stores one piece of registered client information for each slot. To the registration information, in addition to the MAC address of a client and information indicating whether it is manually registered or not as illustrated, information such as a client name that can be arbitrary set by a user and registration date/time may be stored although not shown in the drawing.

[Access Control Process in Accordance with the Mode]

Figure 4:
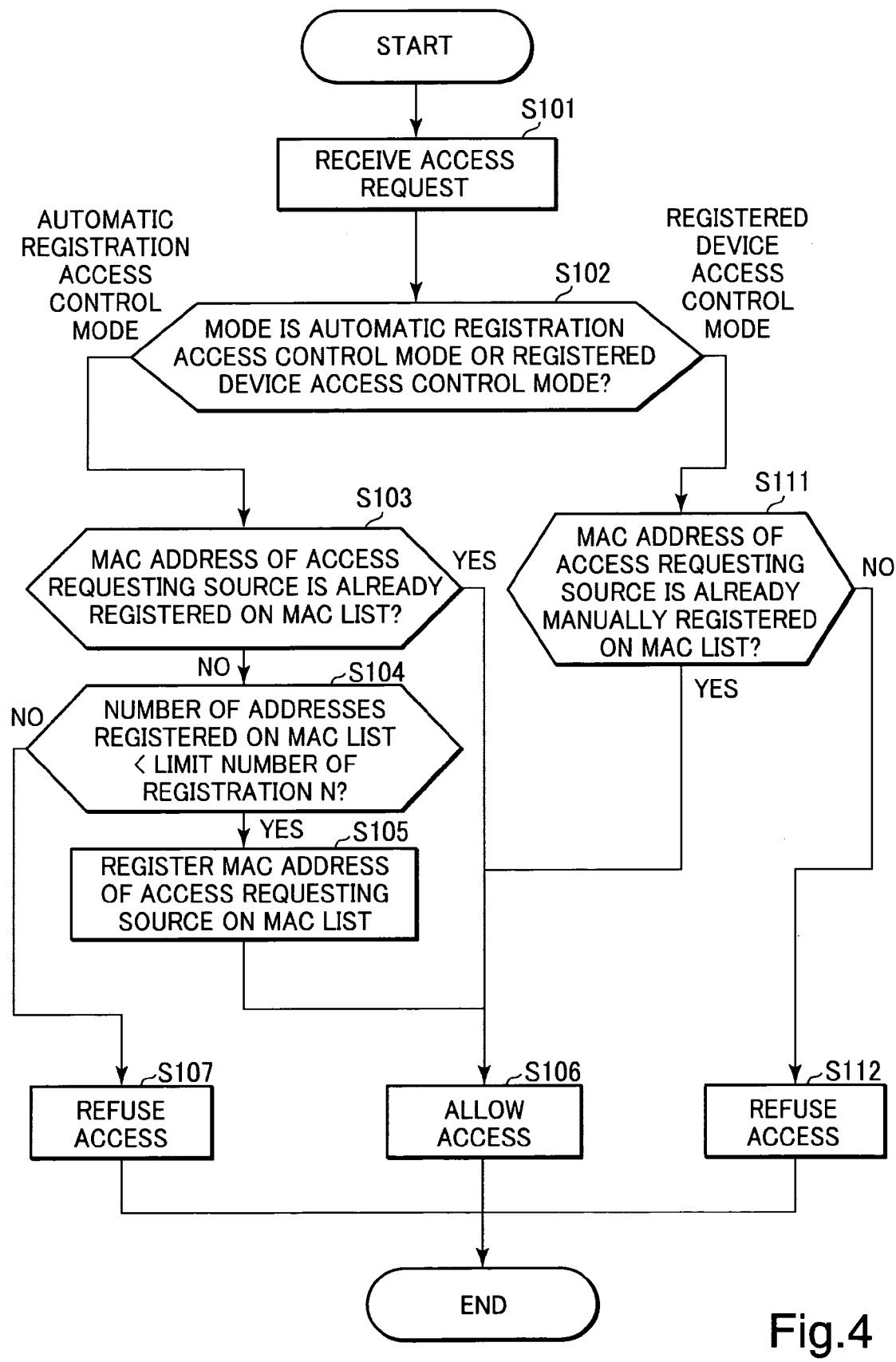
FIG. 4 is a flowchart illustrating the access control process executed by the information processing apparatus of the present invention.

Next, an access control process sequence executed by the information processing apparatus serving as the network-connected device for performing the access control will be described with reference to a flow of FIG. 4.

At Step S101, the information processing apparatus serving as the network-connected device for performing the access control receives an access request from another network-connected device. The description will be made assuming that the information processing apparatus serving as the network-connected device for performing the access control is a server and the information processing apparatus executing the access request is a client.

Figure 5:
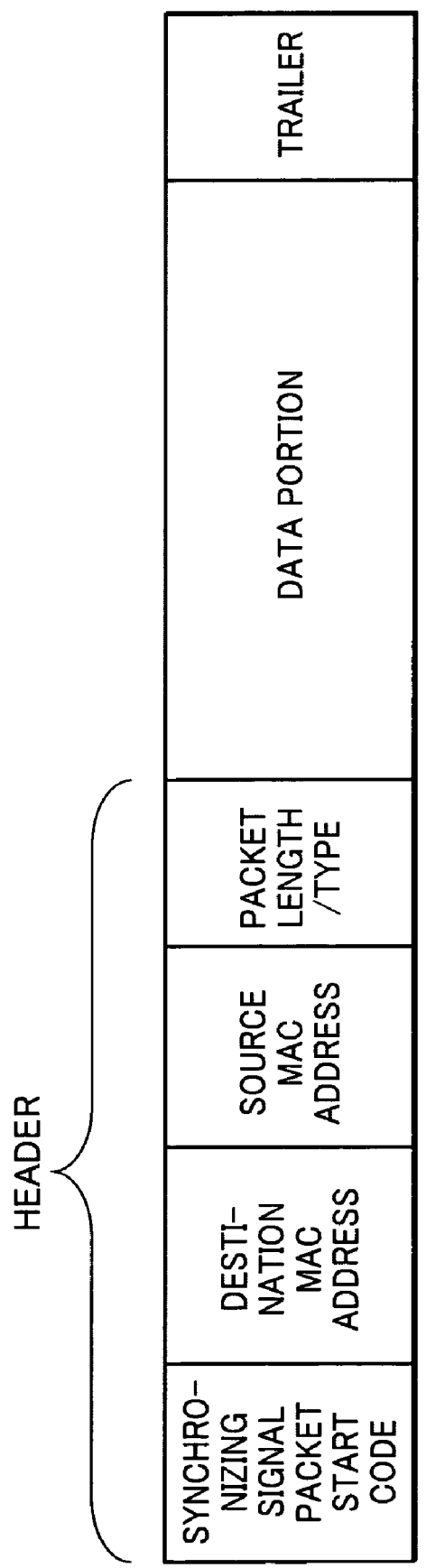
FIG. 5 is a diagram showing a packet structure transmitted from a client.

An exemplary structure of an access request packet (Ethernet frame) transmitted from the client is shown in FIG. 5. The packet is divided into a header portion, a data portion and a trailer portion. The header portion includes a synchronizing signal, a packet start code, a destination MAC address, a source MAC address, and packet length and type.

The data portion includes, for example, data generated in accordance with a TCP/IP communication protocol. For example, an IP packet including source and destination IP addresses is stored therein.

The server executes a different process depending on its own access control mode; (1) the automatic registration access control mode or (2) the registered device access control mode. The server identifies its own mode at Step S102. If it is in (1) the automatic registration access control mode, a process after Step S103 is executed.

At Step S103, a MAC address of an access requesting source is acquired from the packet received from the client. A collation process with the MAC address registered on the MAC address table (see FIG. 3) stored in the memory section of the server and determines whether or not it is already registered. If it is already registered (Step S103: Yes), the process proceeds to Step S106 and allows the access to execute a process in accordance with the request of the client.

If it is not registered yet (Step S103: No), the process proceeds to Step S104 so as to determine whether or not the number of MAC addresses already registered in the MAC address table reaches a limit number of registration: N set in the server, that is, the number of registered MAC addresses<the limit number of registration: N is established.

If the number of registered MAC addresses<the limit number of registration: N is established (Step S104: Yes), the source MAC address set in the header portion of the packet received from the client is registered in the MAC address table. Thereafter, the access is allowed at Step S106 and executes a process in accordance with the request of the client.

If the number of registered MAC addresses>the limit number of registration: N is not established (Step S104: No), specifically, the limit number of registration: N of MAC addresses are already registered in the MAC address table, the automatic registration cannot be executed any more. Therefore, the access request from the client is refused at Step S107 without executing the registration process of the MAC address.

On the other hand, if it is determined that its own mode is (2) the registered device access control mode at Step S102, the process proceeds to Step S111 and acquires the MAC address of the access requesting source from the packet received from the client. Then, it is determined whether or not it is identical with a manually registered MAC address which is subjected to a manual registration process in accordance with a predefined MAC address registration process sequence among the MAC addresses registered in the MAC address table (see FIG. 3) stored in the memory section of the server.

Figure 3:
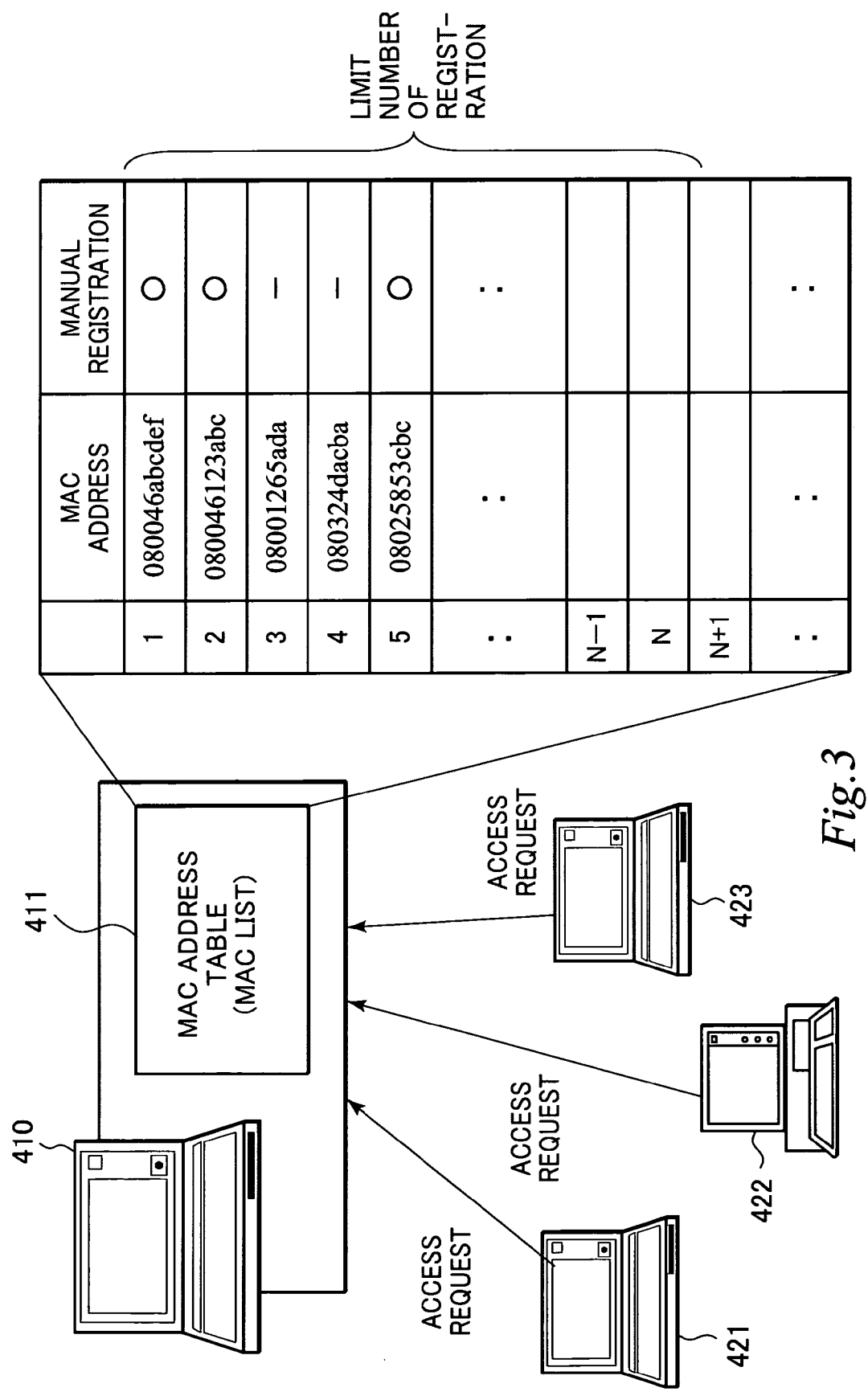
FIG. 3 is a diagram illustrating a MAC address table included in an information processing apparatus according to the present invention and an access control process.

More specifically, in FIG. 3, only the entry indicated with "o" in the manual registration field becomes a MAC address entry to be subjected to a collation process. If the source MAC address (client MAC address) is identical with the manually registered MAC address entry (Step S111: Yes), the process proceeds to Step S106 and allows the access to execute a process in accordance with a request of the client.

On the other hand, if the source MAC address is not identical with the manually registered MAC address entry (Step S111: No), the process proceeds to Step S112 to refuse the access.

In the case of the registered device access control mode, even if the source MAC address is identical with the MAC address automatically registered in the MAC address table, the access is refused.

If the information processing apparatus (server) serving as the network-connected device for performing the access control is in (1) the automatic registration access control mode, the server determines the form of a request from a client. Only in the case of an access request in a specific category, the access control is executed, that is, the collation with the MAC address table and the automatic registration process are executed. If it is not an access request in a specific category, the request from the client may be satisfied without executing the access control, that is, without executing the collation with the MAC address table and the automatic registration process.

The access request in a specific category corresponds to, for example, a request for acquisition of the contents held by the server or a control request to the server. For example, in an UPnP device, the request for acquisition of the contents held by the server is executed based on an HTTP (Hyper Text Transfer Protocol) GET method with a content URL (Uniform Resource Locators) being specified as an identifier of the contents. For the control request to the server, a SOAP (Simple Object Access Protocol) protocol is used.

If the information processing apparatus (server) serving as the network-connected device for performing the access control is in (1) the automatic registration access control mode, the collation with the MAC address table as the access control process and the automatic registration process are executed only in the case where a request from the client is the HTTP (Hyper Text Transfer Protocol) GET method with a content URL (Uniform Resource Locators) being specified or the control request to the server based on the SOAP (Simple Object Access Protocol) protocol, and the access request is allowed under the condition that it is already registered on the MAC address table. If the access from the client is other than the content acquisition request based on the HTTP-GET method or the control request based on the SOAP, for example, a discovery request as a device discovering process in the UPnP, the request from the client is unconditionally accepted without executing the collation with the MAC address table as the access control process and the automatic registration process and a response is given.

A sequence for determining the type of a request from a client to determine whether or not the collation with the MAC address table as the access control process and the automatic registration process are to be executed to implement the process will be described with reference to a flowchart in FIG. 6.

Figure 6:
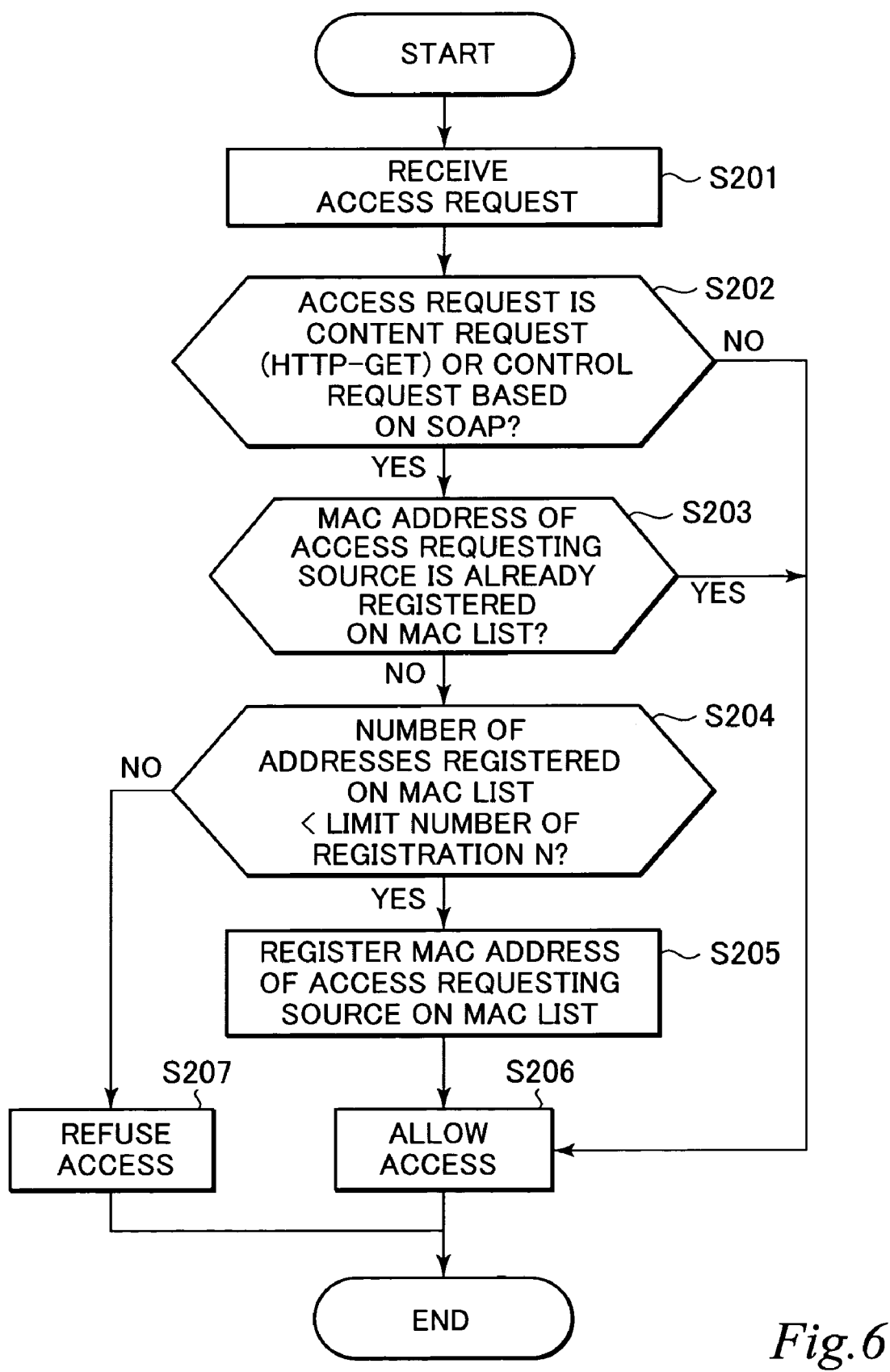
FIG. 6 is a flowchart illustrating the access control process executed by the information processing apparatus of the present invention.

A process flow in FIG. 6 corresponds to a process in the case where the information processing apparatus (server) serving as the network-connected device for performing the access control is in the automatic registration access control mode.

At Step S201, the information processing apparatus serving as the network-connected device for performing the access control receives an access request from another network-connected device. At Step S202, it is determined that the access request from the client is the content acquisition request based on the HTTP-GET method or the control request based on the SOAP.

If the access request from the client is the content acquisition request based on the HTTP-GET method or the control request based on the SOAP (Step S202: Yes), the MAC address of the access requesting source is acquired from the received packet at Step S203 to execute the collation process with the MAC address registered in the MAC address table (see FIG. 3) stored in the memory section of the server so as to determine whether it is already registered or not. If it is already registered (Step S203: Yes), the process proceeds to Step S206 to allow the access and executes a process in accordance with the request of the client.

If it is not registered yet (Step S203: No), the process proceeds to Step S204 and determines whether or not the number of MAC addresses already registered in the MAC address table reaches the limit number of registration: N set in the server, that is, the number of registered MAC addresses<the limit number of registration: N is established.

If the number of registered MAC addresses >the limit number of registration: N is established (Step S204: Yes), the source MAC address set in the header portion of the packet received from the client is registered in the MAC address table. Thereafter, the access is allowed at Step S206 so as to execute a process in accordance with the request of the client.

If the number of registered MAC addresses>the limit number of registration: N is not established (Step S204: No), specifically, the limit number of registration: N of MAC addresses are already registered in the MAC address table, the automatic registration cannot be executed any more. Therefore, the access request from the client is refused at Step S207 without executing the registration process of the MAC address.

On the other hand, if it is determined the access request from the client is neither the content acquisition request based on the HTTP-GET method nor the control request based on the SOAP at Step S202, the process proceeds to Step S206 without executing the collation with the MAC address table and the automatic registration process to allow the access and a process is executed in accordance with the request of the client.

Figure 7:
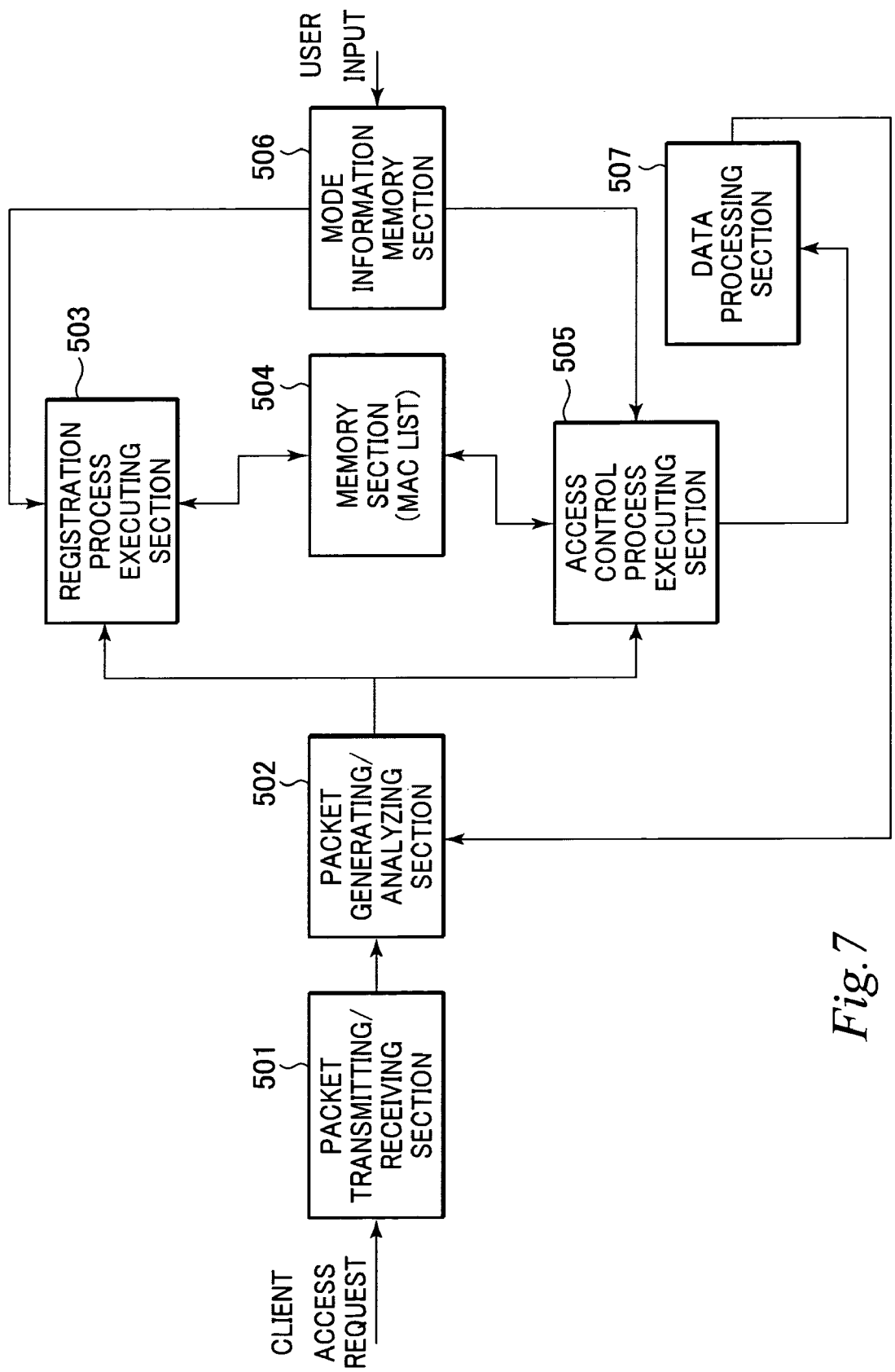
FIG. 7 is a functional block diagram showing an access control process configuration of the information processing apparatus of the present invention.

FIG. 7 shows a functional block diagram illustrating the access control process of the network-connected device (server) for performing the access control. The server includes: a packet transmitting/receiving section 501 for executing the transmission/reception of a packet via a network; a packet generating/analyzing section 502 for analyzing a packet received via the packet transmitting/receiving section 501 and generating a packet to be transmitted via the packet transmitting/receiving section 501; a registration process executing section 503 for determining whether the registration in the MAC address table is possible or not based on a packet received from a client and for executing a registration process of a MAC address if it is determined that the registration is possible; a memory section 504 storing a MAC address table; an access control process executing section 505 for determining whether or not a client making a request for data processing is registered in the MAC address table and executes an access allowance determination process based on various data processing request packets to the server; a data processing section 507 for executing data processing requested by a client under the condition of determination of allowable access in the access control process executing section 505; and a mode information memory section 506 for storing mode information indicating that the server is in (1) the automatic registration access control mode or in (2) the registered device access control mode.

The registration process executing section 503 and the access control process executing section 505 execute a different process depending on the mode setting information set in the mode information memory section 506, that is, depending on in which of the two modes it is, (1) the automatic registration access control mode and (2) the registered device access control mode. For example, if it is in (1) the automatic registration access control mode, the registration process executing section 503 executes the determination whether the automatic registration is allowed or not based on the number of entries registered in the MAC address table stored in the memory section 504 and executes the registration process under the condition that the number is less than the limit number.

Moreover, the registration process executing section 503 also executes the registration allowance determination process. Specifically, it executes a process for determining whether or not a process in accordance with the predefined manual registration process sequence and the like is executed. A detailed example of the manual registration process will be described below.

Figure 8:
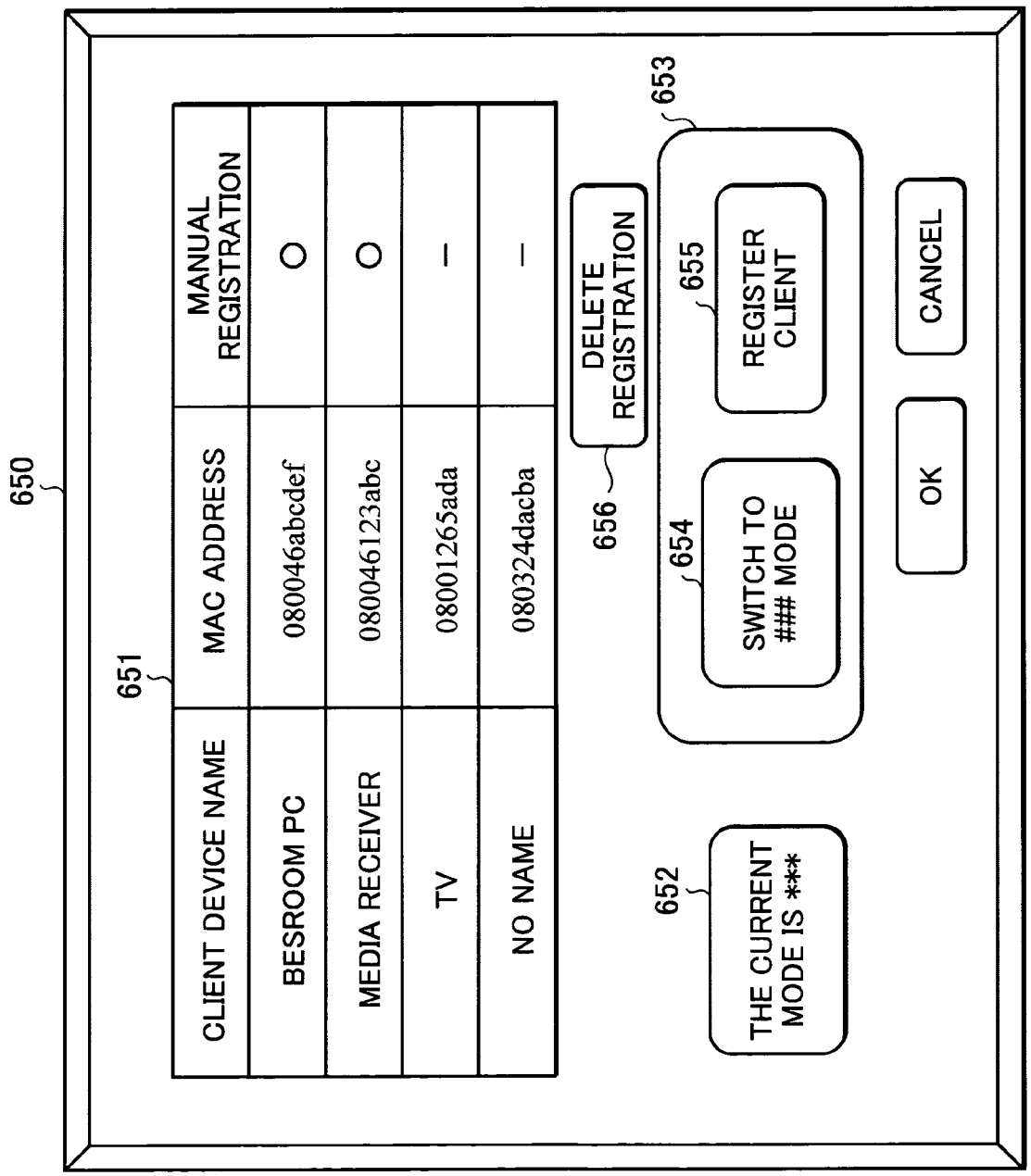
FIG. 8 is a diagram showing an exemplary user interface structure displayed on a display of the information processing apparatus executing the access control process.

FIG. 8 shows an example of the MAC address table displayed on a display in the network-connected device (server) for executing the access control and a user interface for executing the mode setting process.

On a display 650 of the server, a MAC address table 651 consisting of client device names, MAC addresses and data indicating whether it is manually registered or not is displayed. Furthermore, a current set mode information display section 652, a user input section 653 including a mode switching section 654 and a registration confirmation button 655 for registering a MAC address in the manual registration process, and a user interface (UI) including a deletion button 656 for deleting an entry registered in the MAC address table 651 are displayed.

An HTTP-extension header (X-AV-Client-Info) indicating source information as shown in FIG. 9 is added to all the HTTP-GET methods and the SOAPs corresponding to access requests from a client. On the display 650, a display process based on the information is performed. More specifically, for example, as shown in FIG. 9, the HTTP-extension header (X-AV-Client-Info) consisting of:

GET/tracks/track?id=254 HTTP/1.1 ¥r¥n

Host:192.254.32.11:80 ¥r¥n

X-AV-Client-Info: av=2.0 ; cn="Sony Corporation" ;mn=Linux-Sample-CP ; mv=2002-11-22-2.0 ¥r¥n is transmitted from a client.

A user displays the UI as shown in FIG. 8 on the display of the server and can excuse the switching of the mode as well as the confirmation of the MAC address registered in the MAC address table. Furthermore, he/she executes a deletion process of the MAC address registered in the MAC address table as needed.

[Manual Registration Process]

Figure 10:
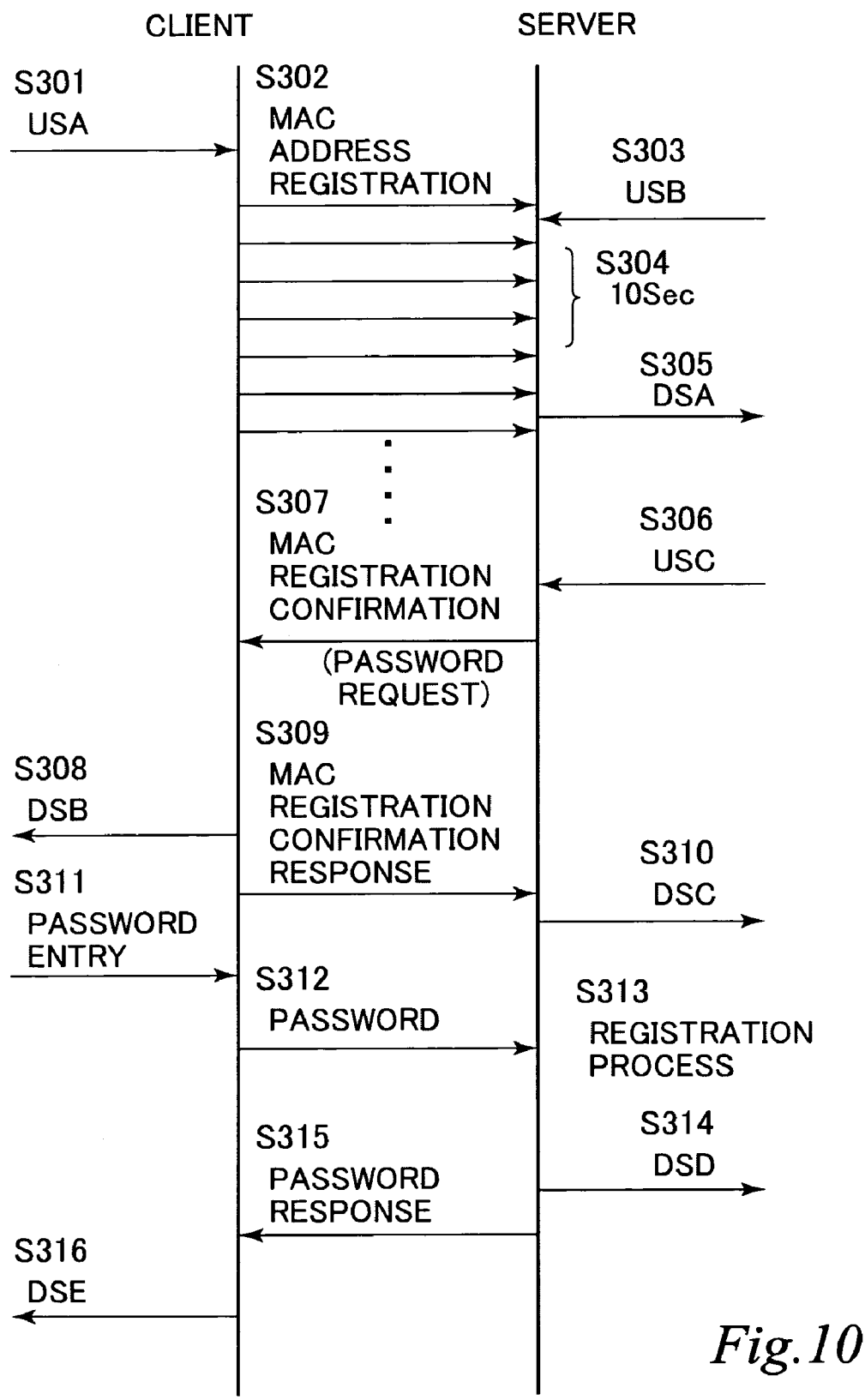
FIG. 10 is a sequence diagram showing an example of a manual registration process sequence of a MAC address.

Next, a procedure of the manual registration process of the MAC address, executed by the information processing apparatus for implementing the access control, will be described with reference to a sequence diagram in FIG. 10. The example shown in FIG. 10 is merely an example of the MAC address registration process that is manually performed, and therefore it is not necessarily indispensable to execute the manual registration in accordance with this example. However, the entry is set only for the MAC address of a client, which is subjected to predefined manual registration, as a MAC address manually registered in the MAC address table (MAC list) shown in FIG. 3.

The sequence shown in FIG. 10 corresponds to a MAC registration process sequence based on device authentication using a password. First, at Step S301, a user presses down a registration button provided on the client (controller) side. As a result, in accordance with a user signal A (USA) generated in response to the press of the registration button, the client device broadcast transmits a MAC address registration request via a network at Step S302. The broadcast transmitting of the MAC address registration request is executed, for example, every three seconds so as to last for several minutes.

After pressing the registration button provided on the client (controller) side, the user moves to the server (device) side. Then, at Step S303, he/she presses a confirmation button provided on the server side. As a result, in accordance with a user signal B (USB) generated in response to the press of the confirmation button, the server receives the MAC address registration request for a defined period of time, for example, for 10 seconds at Step S304.

In the case where the server receives the MAC address registration request from the same source (MAC address) during 10 seconds, it temporarily stores the MAC address in the MAC address table (MAC list) (see FIG. 3). Thereafter, it generates a device signal A (DSA) for displaying a message "Device discovered. Do you register it?" to the user (S305) and waits for a predetermined period of time (for example, for 1 minute) in this state.

If the server refers to the MAC address table and determines that it is the MAC address registration request from the client which is already manually registered, it transmits a notice implying the completion of the MAC registration to terminate the MAC address registration process. Specifically, the server does not register the same MAC address twice.

However, in the case of the manual registration process of the MAC address that is identical with the MAC address registered in the MAC address table by the automatic registration process even though it is not manually registered yet, the server performs a process of changing the MAC address data entry registered in the MAC address table from the automatic registration entry to the manual registration entry.

In the change process, the server executes a process of setting an identifier indicating the completion of the manual registration in a manual registration field corresponding to the entry of the MAC address data being subjected to the automatic registration process in the MAC address table.

While the server is waiting for a predetermined period of time (for example, one minute) with the device signal A (DSA) displaying the message "Device discovered. Do you register it?" being generated at Step S305, the user presses down the confirmation button (the registration confirmation button 655 in FIG. 8) provided on the server side at Step S306. Then, in accordance with a user signal C (USC) generated in response to the press of the confirmation button, the server transmits a MAC registration confirmation request to the client at Step S307. A password request flag is added to the MAC registration confirmation request.

Upon reception of the MAC registration confirmation request with the password request flag, the client generates a device signal for displaying a message "Enter a password for a device "XXXX"" for the user based on the password request flag contained in the received MAC registration confirmation request and waits for the entry of the password for a predetermined period of time (for example, 5 minutes) at Step S308.

Furthermore, the client stops transmitting the MAC address registration request and then returns a MAC registration confirmation response to the server at Step S309.

When the server receives the MAC registration confirmation response, it generates a password (one-time password) at Step S310 to generate a device signal C (DSC) for displaying a message "A password for a client (controller) "YYYY" is "OOOO"" for the user. It waits for a predetermined period of time (for example, 5 minutes) while the password is being presented.

On the other hand, on the client side, when the user enters the password at Step S311 during a password entry waiting period, the client transmits the entered password to the server at Step S312.

Upon reception of the password from the client, the server executes the collation process of the password that is generated at Step S310 to be presented to the user on the server side with the received password. If the password received from the client and the generated password are identical with each other, the server sets the MAC address of the client in the MAC address table (MAC list) (see FIG. 3) as an official entry. At the same time, it sets identification data (such as a flag) indicating that it is manually registered. Alternatively, the automatic registration entry is changed to the manual registration entry.

After the completion of the registration of the MAC address, the server generates a device signal D (DSD) for displaying a message "The client (controller) "YYYY" is successfully registered" for the user at Step S314 and then returns a password response with collation OK to the client at Step S315.

When the client receives the password response as a MAC address registration notice based on the password collation OK from the server, it generates a device signal E (DSE) for displaying a message "The registration on the device "XXXX" is successfully performed" for the user at Step S316 because it is determined that the MAC address is authorized to be registered, thereby terminating the manual registration process with the device authentication of the MAC address.

If the password transmitted from the client is unauthorized, that is, the password received from the client and the password generated by the server are not identical with each other, the server returns a password response with collation NG to the client and waits for the second entry of the password from the client. If the password collation NG successively occurs three times during the waiting period, the server interrupts the retrial of the password entry, displays a message "The controller "YYYY" cannot be registered" for the user, and terminates the process without executing the registration of the MAC address of the client.

Only the MAC address of the client that executes the manual registration process of the MAC address described above is registered as a manually registered MAC address in the MAC address table.

If the server is in the "registered device access control mode", access only from these manually registered clients is allowed.

[Functional Structures of the Server and the Client]

The hardware structures of the server and the client device are as described above with reference to FIG. 2. The above-described various processes are executed by the CPU corresponding to a control section in accordance with a program stored in a memory section of each of the server and the client.

The processes executed by the CPU are, on the server side, for example, inputting a request from the client, analyzing the input information and registering in the MAC address table (MAC list), that is, a process of registering to the access control information based on the results of analysis, generating a packet to be transmitted and received to/from the client and analyzing process, further, outputting various messages in the registration process and a process of analyzing the user input information, and the like. The processes on the client side are generating and transmitting of various request packets to the server, a process of analyzing a packet received from the server, further outputting of various messages in the registration process, a process of analyzing the user input information and the like.

Figure 11:
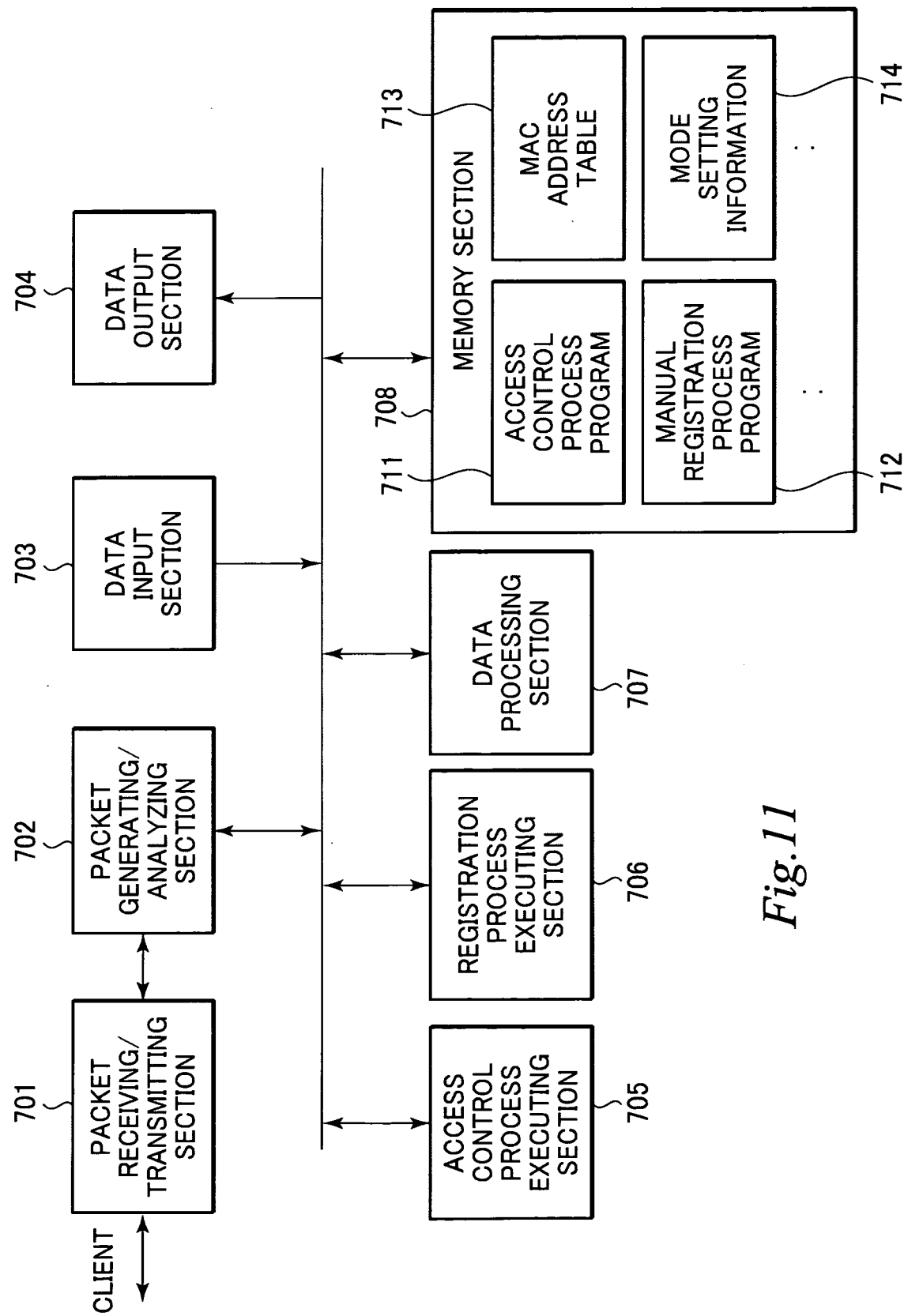
FIG. 11 is a block diagram showing a functional structure of a server.
Figure 12:
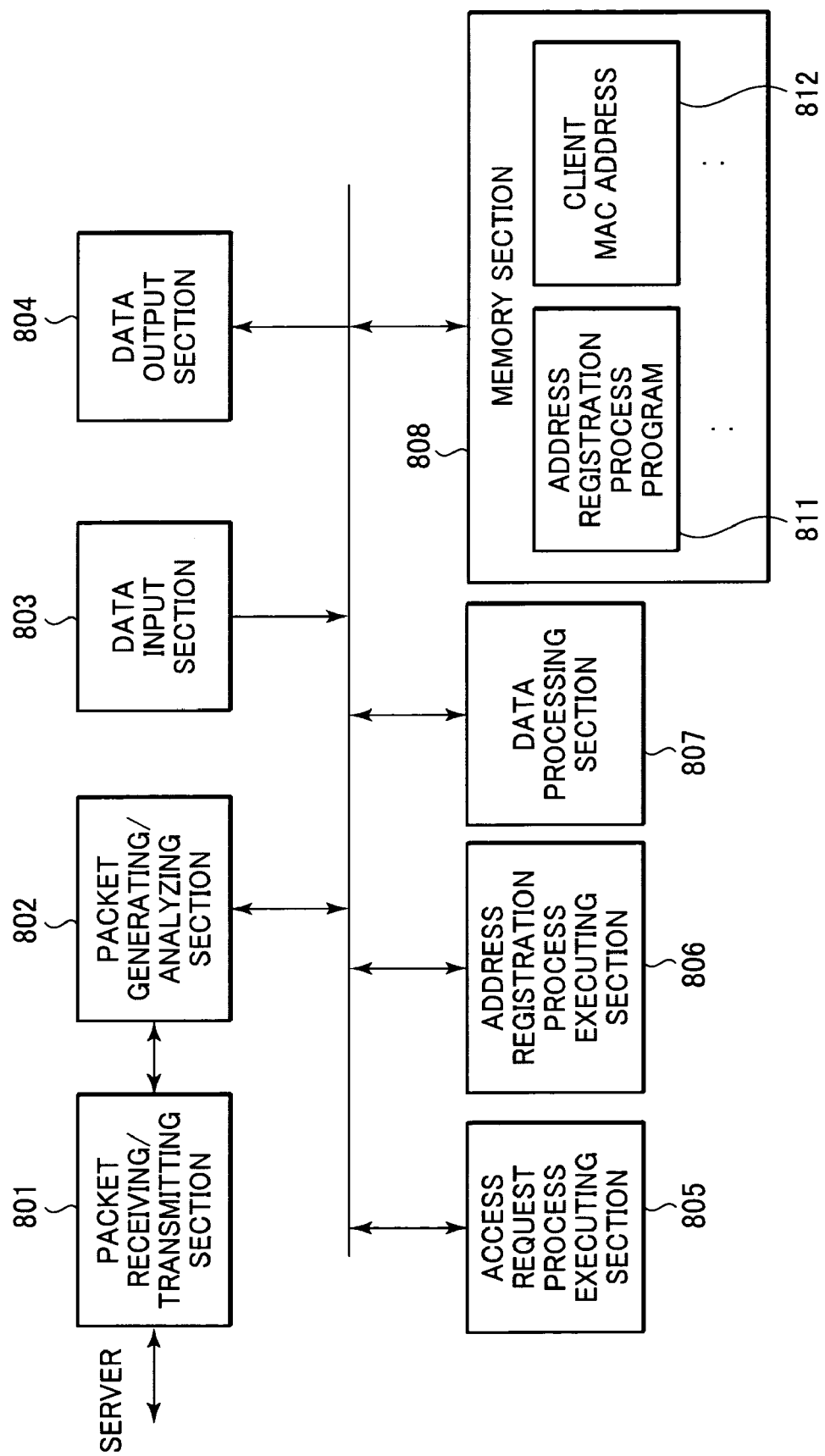
FIG. 12 is a block diagram showing a functional structure of a client.

These processes are basically executed in accordance with a processing program prestored under the control of the CPU serving as the control section of each of the server and the client device. The processes executed by the CPU serving as a control section, data stored in the memory section and the like will be described with reference to FIGS. 11 and 12. FIG. 11 is a block diagram illustrating a principal functional structure of the server, whereas FIG. 12 is a block diagram illustrating a principal functional structure of the client.

First, with reference to the block diagram of FIG. 11 illustrating the functional structure of the server, the functional structure of the server will be described. A packet transmitting/receiving section 701 transmits a packet to the client and receives a packet from the client. A packet generating/analyzing section 702 performs a process of generating a packet to be transmitted and a process of analyzing a received packet. This corresponds to address setting of the packet, address recognition, data storage in a data storage section of the packet, a data acquisition process from the data storage section, and the like.

A data input section 703 is a keyboard, a user interface or the like for executing data entry by the user. A data output section 704 is an output section such as a display for displaying message data and the like.

An access control process executing section 705 executes the access control process in (1) the automatic registration access control mode and the access control process in (2) the registered device access control mode, which have been described above with reference to FIGS. 4 and 6.

A registration processing section 706 executes the MAC address registration process executed in correspondence with access in (1) the automatic registration access control mode and the manual registration process described above with reference to FIG. 10. More specifically, the registration processing section 706 executes a process for registering the client MAC address in the MAC address table as a manually registered MAC address under the condition that the process in accordance with the predefined MAC address registration process sequence has been executed, for example, as in the manual registration process described with reference to FIG. 10.

Furthermore, in the case where the MAC address that is subjected to the manual registration process in accordance with the predefined MAC address registration process sequence is registered in the table as the automatically registered MAC address, the registration processing section 706 executes a setting change process for changing the automatically registered client address entry to the manually registered client MAC address entry.

A data processing section 707 executes a process corresponding to a request from the client whose access is allowed, for example, a content acquisition process or the like. A memory section 708 stores various data processing programs such as an access control processing program 711 to be executed in the access control process executing section 705 and a MAC address registration processing program 712 to be executed in the registration processing section 706. Furthermore, a MAC address table 713, which has been described with reference to FIG. 3 and, in addition, mode information 714 set in the server are stored. The server further stores the contents to be provided for the client, metadata corresponding to the contents and the like.

Next, the functional structure of the client device will be described with reference to FIG. 12. A packet transmitting/receiving section 801 transmits a packet to the server and receives a packet from the server. A packet generating/analyzing section 802 performs a process of generating a packet to be transmitted and a process of analyzing a received packet. This corresponds to address setting of the packet, address recognition, data storage in a data storage section of the packet, a data acquisition process from the data storage section, and the like.

A data input section 803 is a keyboard, a user interface or the like for executing data entry by the user. A data output section 804 is an output section such as a display for displaying message data and the like.

An access request process executing section 805 executes various access request processes to the server such as a content acquisition request and a control request. An address registration process executing section 806 executes a manual registration process of the MAC address, which has been described with reference to FIG. 10.

A data processing section executes various data processing such as a process of reproducing the contents acquired from the server. A memory section 808 stores processing programs such as an address registration processing program 811 executed in the address registration process executing section 806 and, in addition, a MAC address 812 of the client.

The server and the client have the respective functions shown in FIGS. 11 and 12 and execute each of the various processes described above in view of function. However, the block diagrams shown in FIGS. 11 and 12 are for illustrating the functions, and it is not indispensable for the server and the client to have hardware corresponding to the blocks shown in FIGS. 11 and 12. More specifically, various processing programs are executed under the control of the CPU in the structure of the PC or the like shown in FIG. 2 so as to execute the process described with reference to each of the blocks shown in FIGS. 11 and 12 or each of the processes described in the above-described detailed description of the present invention.

The present invention has been described in detail above with reference to specific embodiments. However, it is obvious that those skilled in the art can modify or substitute the embodiments without departing from the gist of the present invention. Specifically, the present invention is disclosed only by way of example, and therefore the description of the specification should not be read in a limited way. In order to determine the gist of the present invention, the claims should be taken into consideration.

A series of processes described in the specification can be executed by hardware, software or a combined structure of them. In the case where the process by the software is executed, a program, in which the process sequence is recorded, can be installed on a memory in a computer incorporated in a dedicated hardware so as to be executed, or a program can be installed on a general-purpose computer capable of executing various processes so as to be executed.

For example, a program can be pre-recorded on a hard disk or a ROM (Read Only Memory) corresponding to a recording medium. Alternatively, a program may be temporarily or permanently stored in (recorded on) a removable recording medium such as a CD-ROM (Compact Disc Read Only Memory), an MO (Magneto optical) disc, a DVD (Digital Versatile Disc), a magnetic disk or a semiconductor memory. Such a removable recording medium can be provided as so-called package software.

Besides the installation on a computer from the removable recording medium as described above, a program can be wirelessly transferred from a download site or can be wire transferred to a computer via a network such as the Internet so that the computer receives the thus transferred program to install it on a recording medium such as a built-in hard disk.

Various processes described in the specification may be executed not only in time series in accordance with the description but also in parallel or individually in accordance with processing capacity of the device executing the process or the needs. In this specification, the system means a logical assembly structure of a plurality of apparatuses, and is not limited to those including the apparatuses having the respective structures within the housing.

INDUSTRIAL APPLICABILITY

As described above, in the structure of the present invention, a MAC address table, in which a manually registered client MAC address and a client MAC address being subjected to an automatic registration process are registered in such a form that they can be distinguished from each other, is set. If an access control mode is an automatic registration access control mode, the MAC address of a client making a request for access is registered up to a defined limit number of registration: N of the MAC address table so that the access control process for allowing access of the client is executed under the condition of the registration process. If the access control mode is a registered device access control mode, an access control process for allowing the access of the client is executed under the condition that the MAC address of the client making the request for access is registered in the MAC address table as a manually registered MAC address. Therefore, even in the case where the manual registration process is not executed by the user, unrestrained access is prevented. For example, the acquisition of the contents stored in the server from an unspecified number of clients and the like can be prevented. Furthermore, by setting the mode to the registered device access control mode, strict access control can be executed.

Furthermore, according to the structure of the present invention, the type of the access request from the client is identified in the automatic registration access control mode. Only if the type of the identified access request corresponds to the type of access request to which predefined access control should be executed, for example, a content request process based on an HTTP (Hyper Text Transfer Protocol)-GET method or a control request process based on a SOAP (Simple Object Access Protocol), the MAC address of the client is registered up to a defined limit number of registration: N of the MAC address table to execute the access allowance under the condition of the registration process. Therefore, unnecessary access control can be prevented from being performed in a device discovery process, an information acquisition process or the like in an UPnP or the like.

The invention claimed is:

1. An information processing apparatus for executing an access control process comprising:

a memory section for storing a MAC address table in which one or more manually registered client MAC addresses and one or more automatically registered client MAC addresses are registered in forms to distinguish each other;

an access control section for executing different access control processes, in response to an access request from a client, in accordance with an access control mode set in the information processing apparatus, wherein the access control mode is an automatic registration access control mode or a manually registered device access control mode; and a registration processing section for executing a setting change process for changing an entry of the one or more automatically registered client MAC addresses to an entry of the one or more manually registered client MAC addresses in the MAC address table, wherein the access control section has a structure in that:

if the access control mode is set as the automatic registration access control mode, one or more MAC addresses of an access requesting client are registered until the number of MAC addresses reaches a defined limit number of registration and the access control process is executed under a condition of the registration process;

if the access control mode is set as the manually registered device access control mode, the access control process is executed under the condition that the one or more MAC addresses of the access requesting client are registered in the MAC address table as one or more manually registered MAC addresses; and if the access control mode is set as the automatic registration access control mode, the access control section identifies the type of access request from the client and registers the one or more MAC addresses of the client up to the defined limit number of registration only in the case where the type of the identified access request corresponds to the type of access request to which access control should be executed, and executes the access control process for allowing access from the client under the condition of the registration process.

2. The information processing apparatus according to claim 1, characterized in that:

the type of access request to which access control should be executed includes at least one of a content request process based on an HTTP (Hyper Text Transfer Protocol)-GET method and a control request process based on a SOAP (Simple Object Access Protocol).

3. The information processing apparatus according to claim 1, wherein:

the registration processing section executes a process for registering the one or more client MAC addresses in the MAC address table as one or more manually registered client MAC addresses under the condition that a manual registration process in accordance with a predefined MAC address registration process sequence is executed.

4. The information processing apparatus according to claim 1, wherein:

the registration processing section executes the setting change when a manual registration process in accordance with a predefined MAC address registration process sequence is executed for the one or more MAC addresses registered as the one or more automatically registered client MAC addresses in the MAC address table.

5. An access control processing method in an information processing apparatus comprising:

an access request receiving step of receiving an access request from a client;

a mode determining step of determining an access control mode set in the information processing apparatus is an automatic registration access control mode or a manually registered device access control mode;

an access control step of executing an access control process for Registering one or more MAC addresses of an access requesting client up to a defined limit number of registration and for allowing access of said client under a condition of the registration process, if the set access control mode is the automatic registration access control mode; and of executing an access control process for allowing access of the client under the condition that the one or more MAC addresses of access requesting client are registered in the MAC address table as one or more manually registered MAC addresses if the set access control mode is the manually registered device access control mode;

a registration processing step of executing a setting change process for changing an entry of the one or more automatically registered client MAC addresses to an entry of the one or more manually registered client MAC addresses in the MAC address table; and in the access control step, if the access control mode is set as the automatic registration access control mode, the type of access request from the client is identified, the one or more MAC addresses of the client up to the defined limit number of registration are registered only in the case where the type of the identified access request corresponds to the type of access request to which a predefined access control should be executed, and a process for allowing access of the client is executed under the condition of the registration process.

6. The access control processing method according to claim 5, characterized in that:

the type of request to which access control should be executed includes at least one of a content request process based on an HTTP (Hyper Text Transfer Protocol)-GET method or a control request process based on a SOAP (Simple Object Access Protocol).

7. The access control processing method according to claim 5, wherein:

the registration processing step executes a process for registering one or more client MAC addresses in the MAC address table as the manually registered client MAC addresses under the condition that a manual registration process in accordance with a predefined MAC address registration process sequence is executed.

8. The access control processing method according to claim 5, wherein:

the registration process step executes the setting change when a manual registration process in accordance with a predefined MAC address registration process sequence is executed for one or more MAC addresses registered in the MAC address table as automatically registered client MAC addresses.

9. A computer program, tangible embodied in the computer-readable storage medium, for executing an access control process in an information processing apparatus comprising:

a mode determining step of determining an access control mode set in the information processing apparatus is an automatic registration access mode or a manually registered device access control mode;

an access control step of executing an access control process for registering one or more MAC addresses of an access requesting client up to a defined limit number of registration if a set access control mode is the automatic registration access control mode, and for allowing the access of said client under the condition of the registration process; and of executing an access control process for allowing the access of the client under the condition that the one or more MAC addresses of the access requesting client are registered in the MAC address table as one or more manually registered MAC addresses, if the set access control mode is the registered device access control mode;

a registration processing step of executing a setting change process for changing an entry of the one or more automatically registered client MAC addresses to an entry of the one or more manually registered client MAC addresses in the MAC address table; and in the access control step, if the access control mode is set as the automatic registration access control mode, the type of access request from the client is identified, the one or more MAC addresses of the client up to the defined limit number of registration are registered only in the case where the type of the identified access request corresponds to the type of access request to which a predefined access control should be executed, and a process for allowing access of the client is executed under the condition of the registration process.

* * * * *